United States Patent
Faass et al.

(10) Patent No.: US 8,906,541 B2
(45) Date of Patent: Dec. 9, 2014

(54) BATTERY MODULE WITH INTEGRATED THERMAL MANAGEMENT SYSTEM

(75) Inventors: Andreas Faass, San Francisco, CA (US); Eric Clough, San Luis Obispo, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 115 days.

(21) Appl. No.: 13/360,643

(22) Filed: Jan. 27, 2012

(65) Prior Publication Data
US 2013/0196184 A1    Aug. 1, 2013

(51) Int. Cl.
*H01M 10/50*    (2006.01)

(52) U.S. Cl.
USPC ............................... 429/148; 429/73; 429/50

(58) Field of Classification Search
USPC .............................................. 429/50, 148, 73
See application file for complete search history.

(56) References Cited

U.S. PATENT DOCUMENTS

| | | | |
|---|---|---|---|
| 6,399,238 B1 | 6/2002 | Oweis et al. | |
| 6,689,510 B1* | 2/2004 | Gow et al. | 429/149 |
| 8,057,630 B2 | 11/2011 | Hermann et al. | |
| 2010/0092849 A1* | 4/2010 | Wood et al. | 429/99 |
| 2010/0104938 A1* | 4/2010 | Hermann | 429/120 |
| 2010/0159317 A1* | 6/2010 | Taghikhani et al. | 429/120 |

FOREIGN PATENT DOCUMENTS

WO    WO 02/27816 A1 *    4/2002

* cited by examiner

*Primary Examiner* — Mark F Huff
*Assistant Examiner* — Olatunji Godo
(74) *Attorney, Agent, or Firm* — J. Richard Soderberg (57) ABSTRACT

A controller identifies a condition of a hazardous internal short by comparing patterns of series element voltages to the last known balance condition of the series elements. If the loaded or resting voltage of one or more contiguous series elements uniformly drop from the previously known condition by an amount consistent with an over-current condition, an over-current internal short circuit fault is registered. The desired response is to prevent the affected series elements from heating to a hazardous temperature by summoning the maximum heat rejection capability of the system until the short ceases and the affected elements cool, the cooling function is no longer able to operate due to low voltage, or the affected series string has drained all of its energy through the short. Also includes are responses that allow the battery pack to continue to power the cooling system even though it may enter an over-discharged state.

17 Claims, 6 Drawing Sheets

BATTERY MODULE WITH INTEGRATED THERMAL MANAGEMENT SYSTEM

BACKGROUND OF THE INVENTION

The present invention relates generally to battery cell housing, and more particularly but not exclusively, to a clamshell cell housing for a battery module including integrated cooling channels.

Many high-performance energy storage solutions now employ series-connected modules that, in turn, are series and parallel combinations of individual battery cells. Battery packs used with electric vehicles store large amounts of energy in a small space, producing high energy densities. The energy is converted into mechanical energy by the power train to move the vehicle, among other uses.

Current battery modules include cell housings (clamshells) as well as additional separate heat conductive components to enable cooling of the battery cells. The heat transfer components are also electrically conductive and hereby have to be electrically insulated from the cells with additional electrical insulation materials.

Conventional modules, having separate components for both mechanical and thermal-management roles limit use of higher energy densities in battery modules because of the inherent limitations in scaling the existing designs. Conventional systems have limited cooling efficiencies arising from limited contact areas of cooling fluid and the battery cells, and because coolant pathways are restricted. Restrictions and complications arise because cooling components are added into spaces between battery cells in the mechanical mount, and it is undesirable to add weight, increase size, or complexities in battery module design. These aspects also make manufacture of the module assembly very difficult. Existing technologies provide for a relatively large number of contact resistances in the thermal pathway of cooling a battery cell: fluid, cooling tube, dielectric laminate, thermal-interface-material (TIM) and the battery cell.

What is needed is a battery housing that incorporates mechanical and thermal-management.

BRIEF SUMMARY OF THE INVENTION

Disclosed is a battery housing that incorporates both mechanical and thermal-management roles. The present invention includes embodiments directed towards a thermally conductive and electrically resistive clamshell for use in a battery module. Additionally, the present invention provides a new module architecture that improves thermal efficiency and manufacturability while reducing costs.

A module including a plurality of electrically-intercommunicated energy storage cells, having a first housing locating and holding the plurality of electrically-intercommunicated energy storage cells within a first corresponding plurality of depressions defined by said first housing, said first housing further defining a first plurality of walls proximate said first corresponding plurality of depressions wherein said first plurality of walls further define a first integrated cooling channel to receive a coolant for the plurality of electrically-intercommunicated energy storage cells.

A method for cooling a module including a plurality of electrically-intercommunicated energy storage cells includes (a) locating and securing the plurality of electrically-intercommunicated energy storage cells within a plurality of depressions defined by a thermal housing; and thereafter (b) flowing coolant through an integrated cooling channel defined by a plurality of walls of said thermal housing, said plurality of walls of said thermal housing directly coupled to both circumferential sidewalls and axial end surfaces of the plurality of electrically-intercommunicated energy storage cells disposed within said plurality of depressions with said coolant in said integrated cooling channel having a direct thermal contact to said plurality of walls.

Features/benefits include elimination of separate cooling and electrical insulating components from the housing which provides many advantages further detailed herein.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a battery housing that incorporates mechanical and thermal-management. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
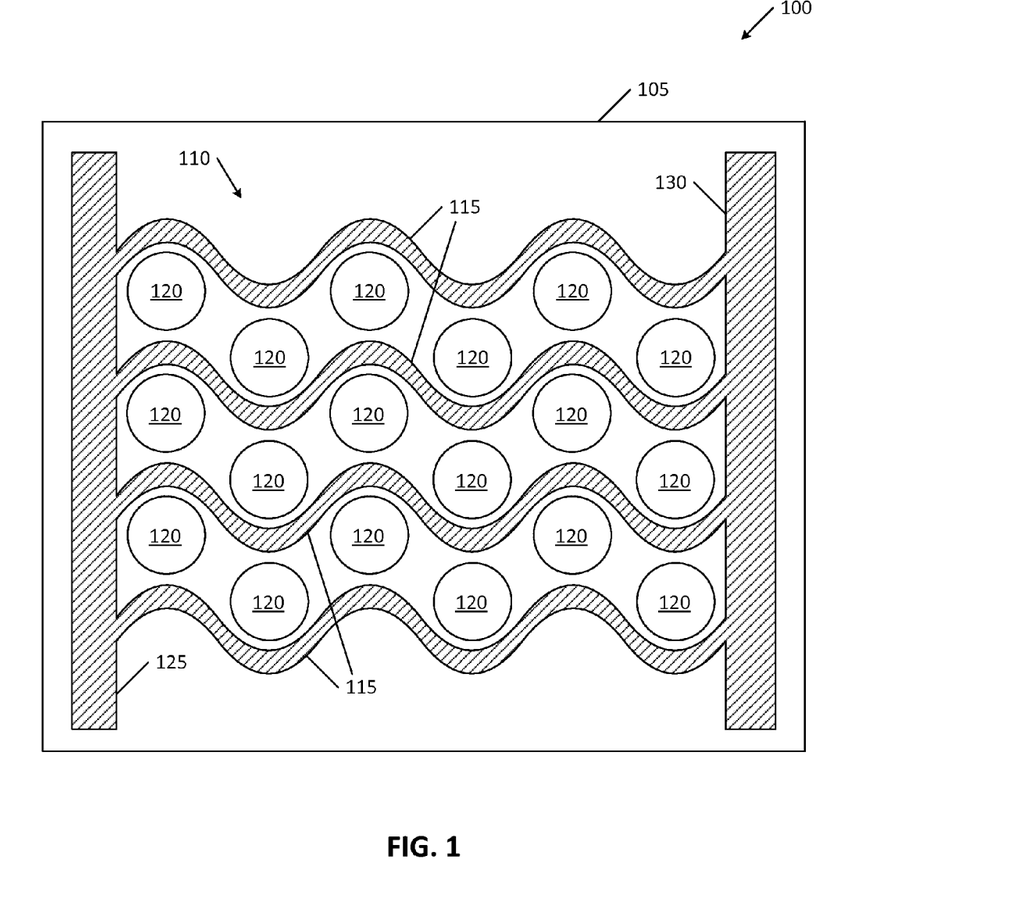
FIG. 1 illustrates a top view of a thermal housing.

FIG. 1 illustrates a top view of a thermal housing 100 including a clamshell 105 holding and protecting a plurality of energy storage devices 110 (e.g., batteries, battery cells, battery assemblies, and the like) Hereafter an individual element is referred to as a "cell" which is understood to include, unless the context indicates otherwise, all manner of discrete energy storage devices. A set of cooling channels 115 are integrated into clamshell 105 that partially circumferentially wrap around individual staggered cell locations accessible through an aperture 120. The set of cooling channels 115 extend between a first fluid stream 125 and a second fluid stream 130. While some embodiments described herein refer explicitly to, or may be suggestive of, a particular form factor for energy storage devices, the present invention is not limited to any particular form factor and may be adapted to a wide-range of form factors.

Clamshell 105 is preferably made of an electrically-insulative, thermally-conductive material, such material including plastics, polymers, and the like. A preferred embodiment includes counter bores for each cell of the plurality of energy storage devices 110 wherein clamshell 105 thus forms a complex pattern of walls, such as between other cells and cooling channels 115. Temperature control attributes of clamshell 105 may be controlled by varying placement, form, height, width, surface properties, pathing, and thicknesses of these walls. Material properties of clamshell 105 may be further adjusted for desired thermal characteristics by use of a filler material to increase thermal conductivity. Clamshell 105 may hold individual cells in place by setting each cell within a counter bore and disposing a low-viscosity thermally-conductive adhesive around the cell while sitting in place. Further temperature control attributes that may be adjusted include use of one (e.g., a top or a bottom) or two (e.g., both a top and a bottom) clamshells 105 for the plurality of energy storage devices 110.

For example, as further shown and described herein, clamshell 105 provides for improved heat transfer from the plurality of energy storage devices 110 due to large area (circumferential around cell sidewalls and on axial end surfaces of the cells) enabled by embodiments of the present invention to transfer thermal energy from cell to coolant disposed within each cooling channel 115. Most preferably, cooling fluid within each cooling channel 115 is in direct contact with clamshell 105. Thus a number of contact resistances in a thermal circuit fluid to cell is reduced as compared to conventional technology that uses a fluid flowing in an aluminum cooling tube insulated using dielectric laminate coupled to a thermal interface material (TIM) coupled to the cell. In contrast with this, a thermal circuit for thermal housing 100 has coolant flowing in cooling channel 115 that is directly coupled to the thermal adhesive holding the cell in place.

In addition to the improvements in thermal transfer, embodiments of the present invention offer reduced costs. The simplicity of this paradigm significantly reduces parts count for, and complexity, of conventional battery modules. Where a conventional module includes separate parts routing coolant and improving heat transfer, many of which must be squeezed into narrow spaces between the cells, thermal housing 100 integrates them as features within clamshell 105. For example, conventional battery modules include heat conductive elements like cooling tubes and thermal interface materials at various contact surfaces, and necessarily electrical insulation, fittings, connectors, sometimes manifold hoses and fittings, for example. Thermal housing 100 reduces or eliminates these elements, as well as labor attendant with their production and assembly. In some embodiments there is a separate channel cover (shown in FIG. 2 and further described below) overlying cooling channels 115 that can slightly increase costs for thermal housing 100 by marginally increased material costs and associated costs for joining this channel cover to cooling channels 115. Even accounting for this relatively small increased cost, embodiments of the present invention can achieve significant savings of as compared to conventional systems.

Further advantages of thermal housing 100 include its improved manufacturability. Thermal housing 100 incorporating fewer, simpler components is one reason for such improvement. Another reason is that the design of thermal housing 100 enables significant assembly advantage in series production, which also decreases its cost. Cells are enabled to simply loosely sit in their counter bores, and a bonding process (e.g., application of thermally-conductive adhesive or the like) produces thermal contact between the cells and clamshell 105 for optimum thermal conductivity. Design of thermal housing 100 allows use of an assembly process that does not require any additional forces to constrain parts, which allows and simplifies automated assembly and reduces risks of potential damage to components/cells during assembly. Some embodiments include use of zero insertion force automation equipment, and application of robotics allows cost efficient high-volume production.

For example, one assembly process for thermal housing 100 includes placing clamshell 105 flat with counter bores facing up and loading cells into the counter bores. Thermal housing 100 may thereafter be closed with a mating clamshell 105 (or other complementary clamshell or structure compatible with clamshell 105) using simple automated processing allowing for low cost high volume production.

In the preceding discussion, it was noted that an advantage of the present invention was coolant flow within any single thermal clamshell 105 may be structured to include serial and/or parallel flow for coolant moving through cooling channels 115 from one cooling stream to the other cooling stream. For example all coolant may flow from first fluid stream 125 to second fluid stream 130. This allows some good control over a temperature gradient of the plurality of batteries. This temperature gradient control is improved by using one thermal clamshell 105 at a first surface (e.g., a first end of a cylindrical cell) of the plurality of energy storage devices 110, and by using another thermal clamshell 105 at a second surface (e.g., a second end of the cylindrical cell). This provides additional permutations for coolant flow patterns, including flowing coolant in opposing directions in the different thermal clamshells 105.

As noted above, one of the benefits of thermal housing 100 is the increased thermal conductivity resulting from the present design. The contact surface area may be made larger, but thermal housing 100 also provides thermally conductive contact areas at the axial surfaces, in addition to the radial surfaces, of the cells. Cells typically have greatest heat generation at the axial ends near the axial surfaces, thus directly cooling these areas produces greater cooling and cooling efficiency. These thermally conductive contact areas of thermal housing 100 are part of thermal clamshell 105 (i.e., in and around the counter bore), or in some embodiments, specific axial area coolant tracks are added into cooling channel 115. Further advantages are that the cooling features of thermal clamshell 105 may be adapted to cool additional structures used with thermal housing 100. For example, it is the case that terminals of the cells are accessible through apertures 120, and that one structure that may couple to all the terminals of one thermal clamshell includes one or more collector plates electrically communicated to the terminals. Current flowing out of the plurality of energy storage devices 110 may heat these plates, and the axial heating element/structure is available to cool such collector plates as well. Cooling these plates results in increased efficiency for the module constructed using thermal housing 100 with the collector plate cooling feature.

It is common for an energy storage system, such as those used in an electric vehicle or the like, to include a battery pack. The battery pack is often structured to include an assembly of a plurality of battery modules. When these modules are formed from thermal housing 100, it is possible to greatly simplify the stacking and interconnection of collections of the modules. Thermal housing 100 is adaptable to enable stacking of such modules right next to one another, with short connectors (some of which may be integrated into thermal housing 100) which eliminates any external manifolds and associated connectors that are necessary with conventional module technology. In some embodiments, manifold structures may be formed directly into thermal housing 100. Interconnections of these modified thermal housings may be simplified by adding male couplers that are complementary to female couplers in a fashion that permits easy stacking and assembly. Embodiments including both male and female couplers integrated into thermal housing 100 allow quick interconnection by just "snapping" them together using the male couplers of one thermal clamshell to engage the female couplers of another thermal clamshell.

Figure 2:
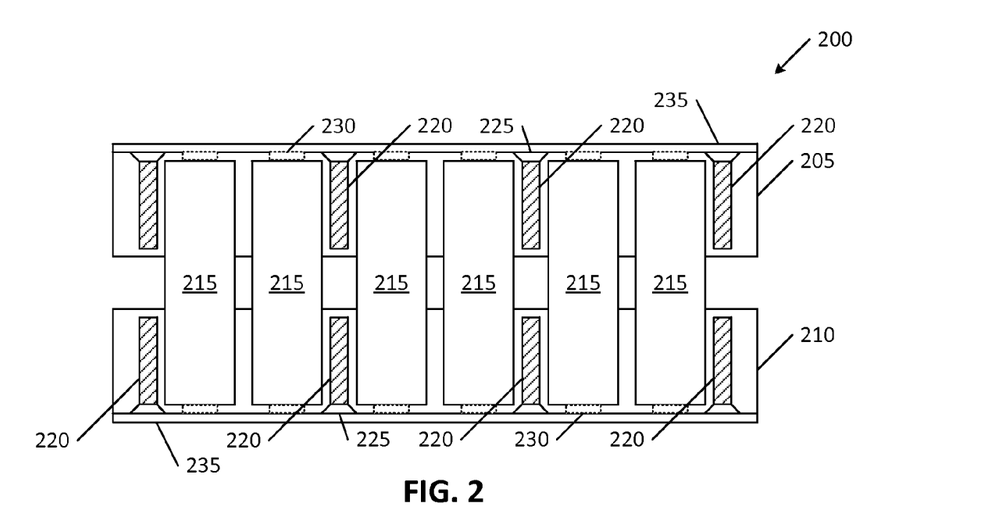
FIG. 2 illustrates a first side view of the thermal housing of FIG. 1.

FIG. 2 illustrates a first side view of a thermal housing 200 including a first thermal clamshell 205 and a second thermal clamshell 210. Thermal housing 200 is a specific implementation of thermal housing 100 shown in FIG. 1 and includes the structures and features described herein, except where the context suggests otherwise. First side view of thermal housing 200 is generally in the direction towards second fluid stream 130 from first fluid stream 125. Thermal housing 200 is an assembly of batteries, such as cells 215, secured in place by first thermal clamshell 205 coupled to second thermal clamshell 210.

Thermal housing 200 includes a plurality of cooling channels 220 integrated directly into first thermal clamshell 205 and second thermal clamshell 210. Cooling channels 220 are shown with a hatch fill to represent the coolant disposed directly within. Thermal housing 200 illustrates a separate channel cover 225 overlying each cooling channel 220. To simplify addition of channel cover 225 for each cooling channel 220, a perimeter of each top of cooling channel 220 is beveled, allowing the top to be sealed so each cooling channel 220 is open on lateral ends, such as where cooling channel 220 couples to a fluid stream. Each clamshell further includes a plurality of apertures 230 allowing access to axial ends (e.g., electrical terminals) of each cell 215. A collector plate 235 is coupled to each clamshell and accesses each cell 215 through apertures 230. The actual arrangement and orientation of cells 215, cooling channels 220, apertures 230, and collector plates 235 is more complicated than shown here. As noted herein, there are many parameters affecting the thermal circuit between fluid within cooling channel 220 and each cell 215 and/or collector plate 235 that are adjusted for each implementation in order to achieve a desired optimization.

Figure 3:
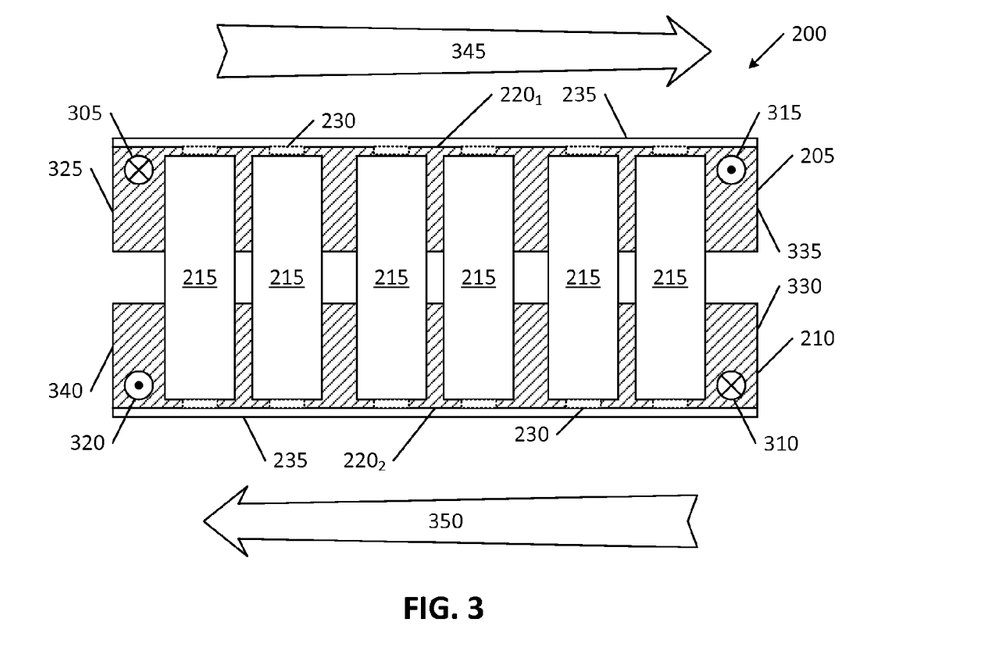
FIG. 3 illustrates a second side view of the thermal housing of FIG. 1.

FIG. 3 illustrates a second side view of thermal housing 200. Second side view of thermal housing 200 is generally orthogonal to the first side view and is generally parallel to the fluid streams shown in FIG. 1. In addition to the components shown in FIG. 2, thermal housing 200 includes a first inlet 305, a second inlet 310, a first outlet 315, and a second outlet 320, each respectively at one end of four fluid streams (e.g., a first fluid stream 325, a second fluid stream 330, a third stream 335, and a fourth stream 340). There are complementary structures at the other end of each fluid stream that are not visible in this second side view, thus thermal housing 200 includes a total of four inlets and four outlets.

As noted herein, there are different fluid flow formats possible with embodiments of the present invention. In thermal housing 200, coolant flows into the inlets and flows out of the outlets to generate the fluid streams. Additionally, each cooling channel 220 provides a cooling flow between two streams. For example, a first cooling channel $220_1$ supports a first cooling flow 345 from first fluid stream 325 to third fluid stream 335. a second cooling channel $220_2$ supports a second cooling flow 350 from second fluid stream 330 to fourth fluid stream 340.

Each fluid flow produces a temperature gradient for cells 215 as thermal energy is transferred. To simplify the present discussion, a common implementation for thermal housing 200 is to cool cells 215, and the discussion is specific to such an implementation. It should be noted that for some cases it may be desirable to heat cells, such as for start-up in low temperature ambient scenarios), and relative temperatures will be reversed to transfer thermal energy to cells 215 from fluid in cooling channel 220.

Thus, in the present example, coolant flowing into an inlet is cooler than coolant flowing out of an associated outlet. Each inlet couples coolant to two outlets, and each outlet is fed with coolant from two inlets. A direction for each coolant flow is determined by relative pressure differentials between the fluid streams. For example, first fluid stream 325 has a greater pressure than third fluid stream 335, with first cooling flow 345 established in first cooling channel $220_1$ from first fluid stream 325 to third fluid stream 335. Similarly, second fluid stream 330 has a greater pressure than fourth fluid stream 340, with second cooling flow 350 established in second cooling channel $220_2$ from second fluid stream 330 to fourth fluid stream 340.

First cooling flow 345 creates a first temperature gradient for cells 215 with a top axial ends of cells 215 getting warmer in the direction of first cooling flow 345. Second cooling flow 350 creates a second temperature gradient for cells 215 with a bottom axial ends of cells 215 getting warmer in the direction of second cooling flow 350. The gradients are complementary in that a top axial end of the left-most cell 215 is coolest while the bottom axial end of this left-most cell 215 is warmest. For the next cell to the right, the top axial end is marginally warmer while the bottom axial end of the same cell is marginally cooler, as compared to cell 215 to its left. This pattern continues as one evaluates the cells from left-to-right until about the mid-point of the cooling flows in which the top axial end of these mid-flow cells has about the same temperature as the bottom axial end. Thereafter, the top axial ends become warmer than the bottom axial ends, and a temperature differential of top axial ends and bottom axial ends for each cell becomes greater as continuing to move to the right. Finally, at the end of first cooling flow 345 (i.e., the right-most cell 215), the top axial end is much warmer than the corresponding bottom axial end). The temperature gradients are thus generally mirror images of each other, and when combined together in such a cooling crossflow, the crossflow produces a generally consistent average temperature for all cells 215.

Note that a similar gradient pattern exists for a next row of cells 215 "behind" the row of cells shown in FIG. 3. That is, thermal housing 200 holds cells 215 in a matrix, having a series of rows, each with a gradient pattern similar to, though not exactly the same, as shown in FIG. 3. For example, in a "next" row, a coolant producing a third cooling flow extending from first fluid stream 325 to third fluid stream 335 enters a third cooling channel 220 a bit warmer and exits a bit cooler. The crossflow (i.e., a fourth cooling flow for the opposite ends of the same row of cells 215) for that row is also a mirror image, thus producing about the same average temperature profile for cells of that row.

Figure 4:
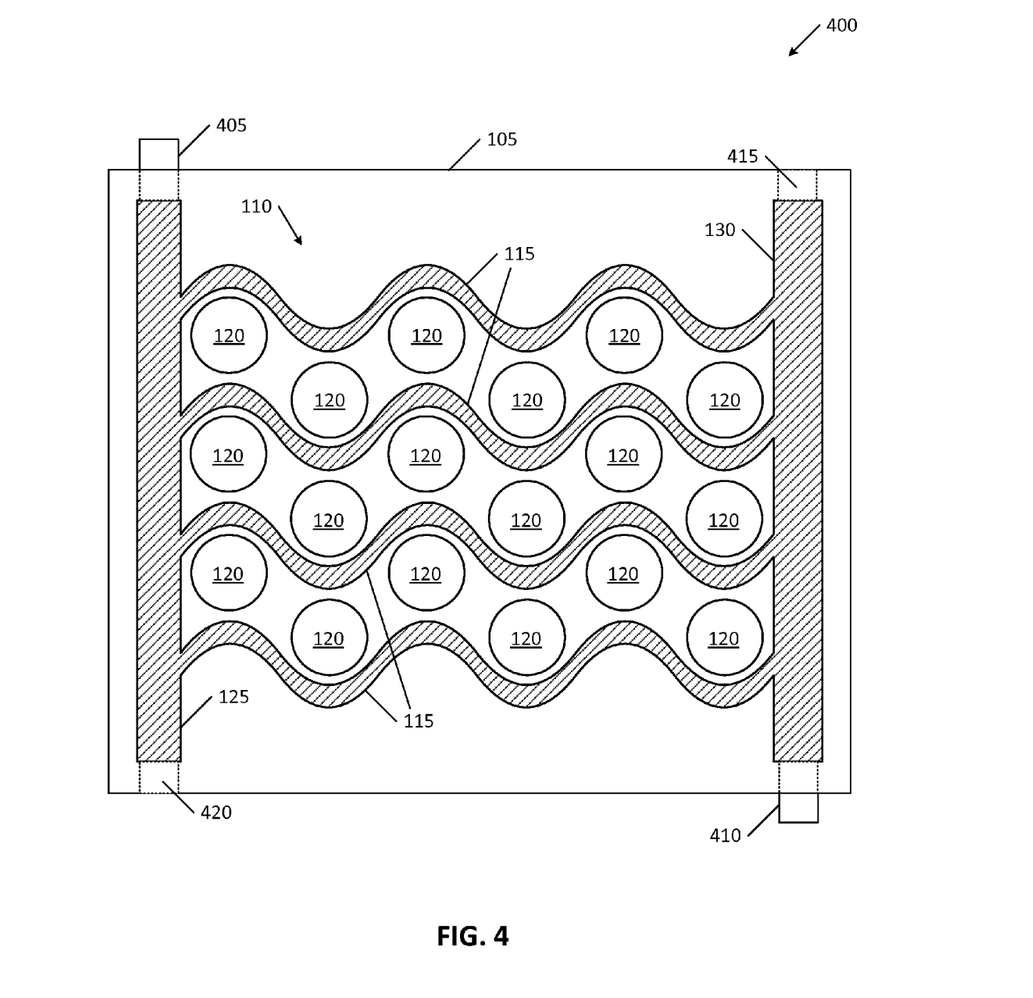
FIG. 4 illustrates a top view of a modified thermal housing.

FIG. 4 illustrates a top view of a modified thermal housing 400 configured for stacking. Modified thermal housing 400 is modified from thermal housing 100 with the addition of a first male coupler 405, a second male coupler 410, a first female coupler 415, and a second female coupler. First female coupler 415 defines an inlet for, and first male coupler 405 defines an outlet for, first fluid stream 125. Second female coupler 420 defines an inlet for, and second male coupler 410 defines an outlet for, second fluid stream 130. These couplers, configured in this representative format, is one way to enable efficient stacking of modified thermal housings 400. When necessary or desirable, fluid seals are integrated as appropriate with these couplers.

Figure 5:
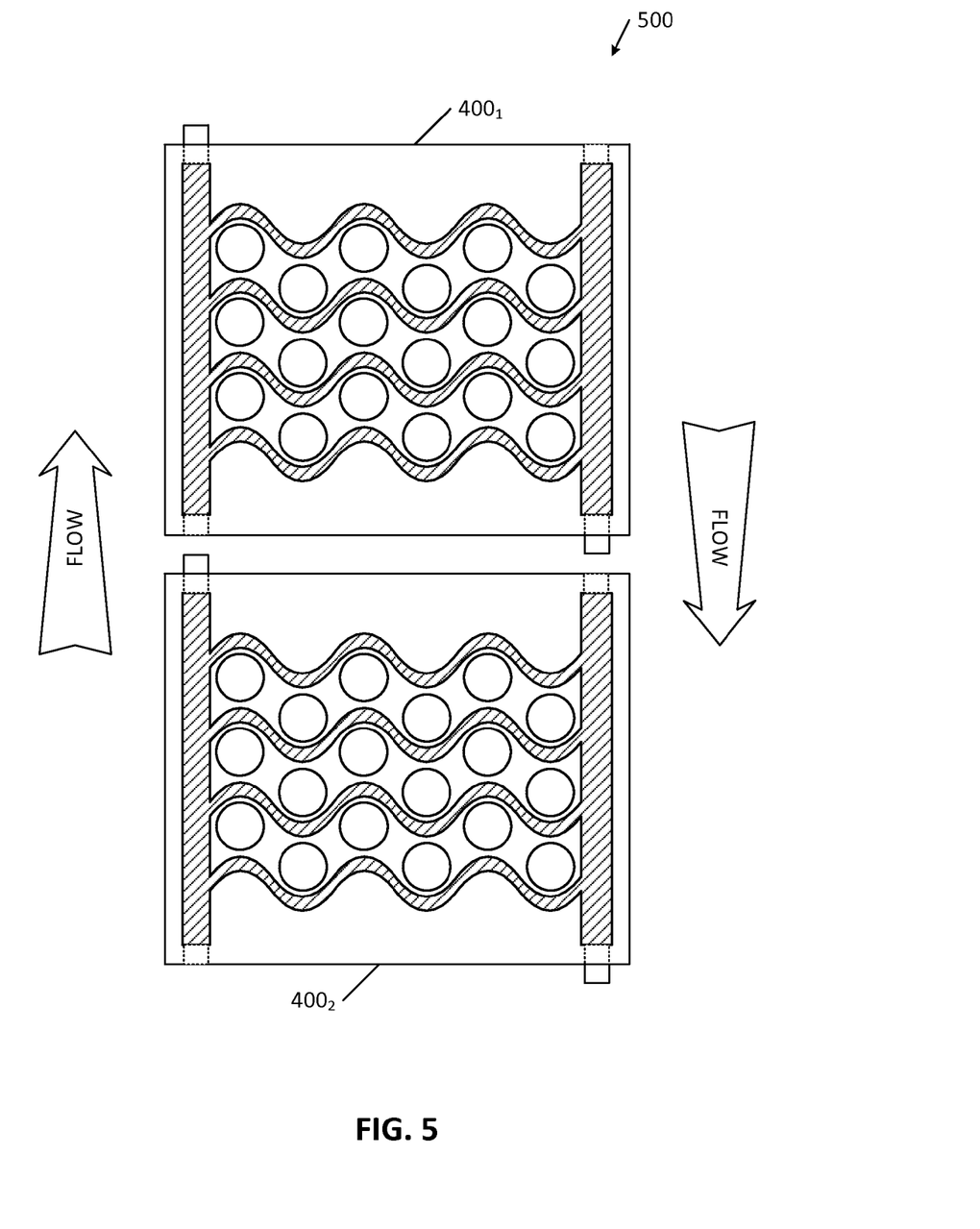
FIG. 5 illustrates a top view of a pair of interlocking modified thermal housings shown in FIG. 4.

FIG. 5 illustrates a top view of a battery pack 500 including a pair of interlocking modified thermal housings configured as shown in FIG. 4. A first modified thermal housing $400_1$ is mated to a second modified thermal housing $400_2$ using the couplers integrated into the fluid streams and produce an extended fluid stream that moves from one modified thermal housing to the other thermal housing.

Figure 6:
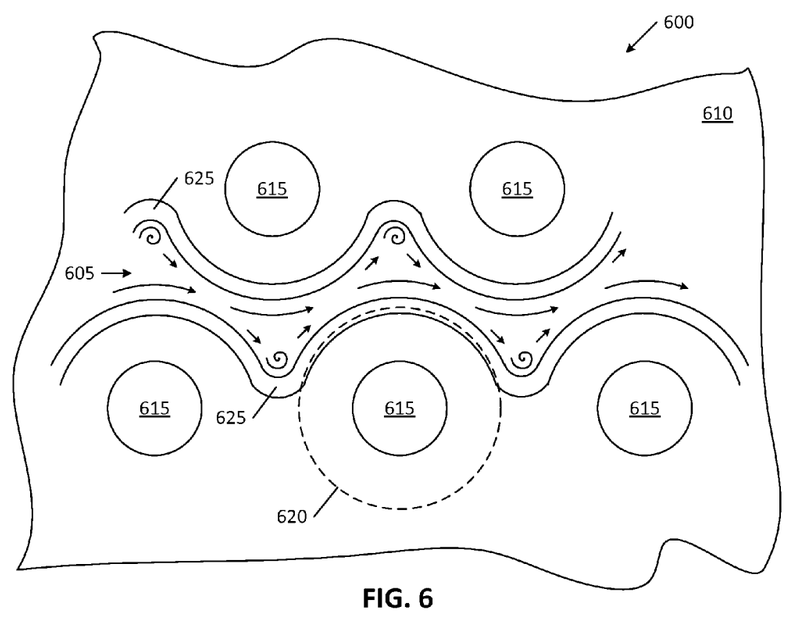
FIG. 6 illustrates an optimized coolant channel.

FIG. 6 illustrates an overhead view of a portion 600 of an optimized cooling channel 605, such as cooling channel 115 described in the context of FIG. 1, or cooling channel 220 described in the context of FIG. 2, in a clamshell 610. The arrows of FIG. 6 depict the direction of the cooling flow. Clamshell 610 includes apertures 615 permitting access to axial surfaces of a cell 620. (For clarity, a single cell 620 is shown, however it is understood that a cell 620 is provided at each location of aperture 615.)

Cooling channel 605 is a three-dimensional structure defined by the walls of clamshell 610, cooling channel 605 has a depth and a length, as well as a varying width, all optimized to produce an efficient coolant flow pattern. Cooling channel 605 includes a beveled perimeter top edge 625 designed to make it easier to join a channel cover (e.g., channel cover 225) for a fluid-resistant seal.

The non-labeled arrows in FIG. 6 illustrate coolant flow progressing from cell-to-cell. The geometry of optimized cooling channel 605 is adjusted to produce a desired combination of high-turbulence/Nusselt number (e.g., good heat rejection) and low pressure drop. Areas of turbulence are depicted in FIG. 6 using spirals.

Figure 7:
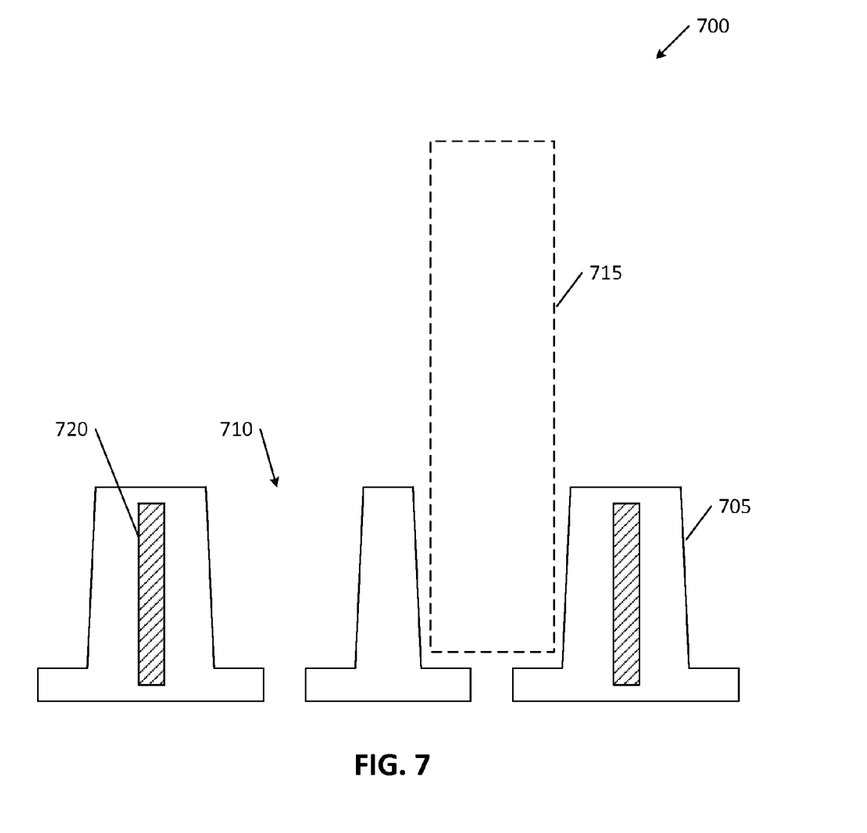
FIG. 7 illustrates a clamshell provided with a plurality of counter bores for easy receipt of a plurality of cells.

FIG. 7 illustrates a detail portion 700 of a clamshell 705 highlighting a representative set of a plurality of counter bores 710, each counter bore 710 for easy receipt of a plurality of cells 715. Clamshell includes integrated cooling channels 720. Clamshell 705 is representative of a configuration and arrangement suitable for clamshell 105 in which counter bores 710 have widened and sloped walls allowing easy insertion of cells 715, which will thereafter locate and support cells 715 for further assembly, including addition of adhesive and addition of a complementary mating structure, such as a second clamshell similar to clamshell 705 along the opposing ends of cells 715. U.S. Pat. No. 8,057,630 filed 2 Mar. 2010, the contents of which are expressly incorporated by reference thereto in its entirety for all purposes, describes one suitable mechanism for application of a low-viscosity adhesive into counter bores 710.

The systems and methods are preferably implemented using a microprocessor executing program instructions from a memory, the instructions causing the apparatus to perform as described herein. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A module including a plurality of cylindrical electrically-intercommunicated energy storage cells, comprising:
a first clamshell locating and holding the plurality of cylindrical electrically-intercommunicated energy storage cells within a first corresponding plurality of circular depressions defined by said first clamshell, said first clamshell further defining: (i) first and second fluid streams along opposite lateral edges of the first clamshell, and (ii) a first plurality of walls that each extends from one of the fluid streams to another of the fluid streams, the walls being proximate said first corresponding plurality of depressions and partially circumferentially wrapping around each individual staggered location of the cells in alternating clockwise and counterclockwise directions, wherein said first plurality of walls further define a first integrated cooling channel inside said first plurality of walls to receive a coolant for the plurality of electrically-intercommunicated energy storage cells.

2. The module of claim 1 wherein said first plurality of walls consist essentially of an electrically-insulative thermally-conductive material.

3. The module of claim 2 wherein each energy storage cell of the plurality of electrically-intercommunicated energy storage cells includes a cylindrical cell, wherein said first clamshell is substantially planar, and wherein said first corresponding plurality of depressions are arranged in an ordered matrix, each depression including a counter bore receiving a particular one cylindrical cell and holding said particular one cylindrical cell substantially upright.

4. The module of claim 3 wherein said ordered matrix includes a plurality of groups of rows of depressions, each said group of depressions including a first row of a set of said plurality of depressions alternated with a second row of a set of said plurality of depressions, with said second row offset from said first row, and wherein a portion of said first integrated cooling channel is disposed between each said group of rows of depressions.

5. The module of claim 1 wherein each said first and second fluid stream includes an inlet coupler receiving said coolant and an outlet coupler discharging said coolant, said inlet coupler complementary to said outlet coupler.

6. The module of claim 1 wherein each energy storage cell of the plurality of cylindrical electrically-intercommunicated energy storage cells has an axial voltage terminal at one end and wherein each said depression includes an aperture accessing said axial voltage terminal of said corresponding cylindrical electrically-intercommunicated energy storage cell.

7. The module of claim 6 further comprising a collector plate coupled to each said axial voltage terminal of the plurality of cylindrical electrically-intercommunicated energy storage cells through said apertures.

8. The module of claim 1 wherein each energy storage cell of the plurality of cylindrical electrically-intercommunicated energy storage cells has a circumferential sidewall and an axial cap and wherein said coolant in said first integrated cooling channel defines a direct cooling contact surface with a set of walls of said first plurality of walls that extend at least partially circumferentially around said circumferential sidewall and over said axial cap.

9. The module of claim 8 wherein said first integrated cooling channel includes a coolant pathway providing, for each energy storage cell of the plurality of electrically-intercommunicated energy storage cells, a channel pathing geometry producing an area of high turbulence and an area of low pressure drop responsive to flow of said coolant within said coolant pathway.

10. The module of claim 1 wherein said first plurality of depressions locate and hold a first portion of the plurality of cylindrical electrically-intercommunicated energy storage cells, further comprising a second clamshell, coupled to said first clamshell, locating and holding a second portion of the plurality of cylindrical electrically-intercommunicated energy storage cells within a second corresponding plurality of circular depressions defined by said second clamshell, said second clamshell further defining: (i) third and fourth fluid streams along opposite lateral edges of the second clamshell, and (ii) a second plurality of walls that each extends from one of the third and fourth fluid streams to another of the third and fourth fluid streams, the walls being proximate said second corresponding plurality of circular depressions wherein said second plurality of walls further define a second integrated cooling channel inside said second plurality of walls to receive said coolant for the plurality of cylindrical electrically-intercommunicated energy storage cells.

11. The module of claim 10 wherein said pluralities of walls consist essentially of an electrically-insulative thermally-conductive material.

12. The module of claim 11 wherein said first plurality of circular depressions of said first clamshell face towards said second plurality of circular depressions of said second clamshell, wherein said first and second clamshells are substantially planar, and wherein said corresponding pluralities of circular depressions are arranged in an ordered matrix, each depression of said first clamshell housing including a counter bore receiving a first portion of a particular one cylindrical cell and holding said particular one cylindrical cell substantially upright to extend into a corresponding depression of said second clamshell, each circular depression of said second clamshell housing receiving a second portion of said particular one cylindrical cell and holding said particular one cylindrical cell substantially upright.

13. The module of claim 12 wherein said ordered matrix includes a plurality of first clamshell groups of rows of circular depressions, each said first clamshell group of circular depressions including a first row of a set of said first plurality of circular depressions alternated with a second row of a set of said first plurality of circular depressions, with said second row offset from said first row, and wherein a portion of said first integrated cooling channel is disposed between each said first clamshell group of rows of circular depressions and wherein said ordered matrix includes a plurality of second clamshell groups of rows of circular depressions, each said second clamshell group of circular depressions including a first row of a set of said second plurality of circular depressions alternated with a second row of a set of said second plurality of circular depressions, with said second row offset from said first row, and wherein a portion of said second integrated cooling channel is disposed between each said second clamshell group of rows of circular depressions.

14. The module of claim 13 wherein said coolant flows in said first integrated channel from said first fluid stream to said second fluid stream and wherein said coolant crossflows in said second integrated channel from said third fluid stream to said fourth fluid stream.

15. The module of claim 14 wherein each said third and fourth fluid stream includes an inlet coupler receiving said coolant and an outlet coupler discharging said coolant, said inlet couplers complementary to said outlet couplers.

16. The module of claim 10 wherein said first integrated cooling channel includes a coolant pathway providing, for each energy storage cell, a channel pathing geometry producing an area of high turbulence and an area of low pressure drop responsive to flow of said coolant within said coolant pathway.

17. A stacked module, comprising:
a first module and a second module each according to claim 14, wherein a set of said outlet couplers of said first module sealingly engage corresponding inlet couplers of said second module and wherein a set of said outlet couplers of said second module sealingly engage corresponding inlet couplers of said first module wherein said fluid streams extend between said first module and said second module using said engaged couplers.

* * * * *